Dec. 24, 1940.  R. B. TAYLOR  2,225,669
PURIFICATION OF REFRIGERANT
Filed May 25, 1939
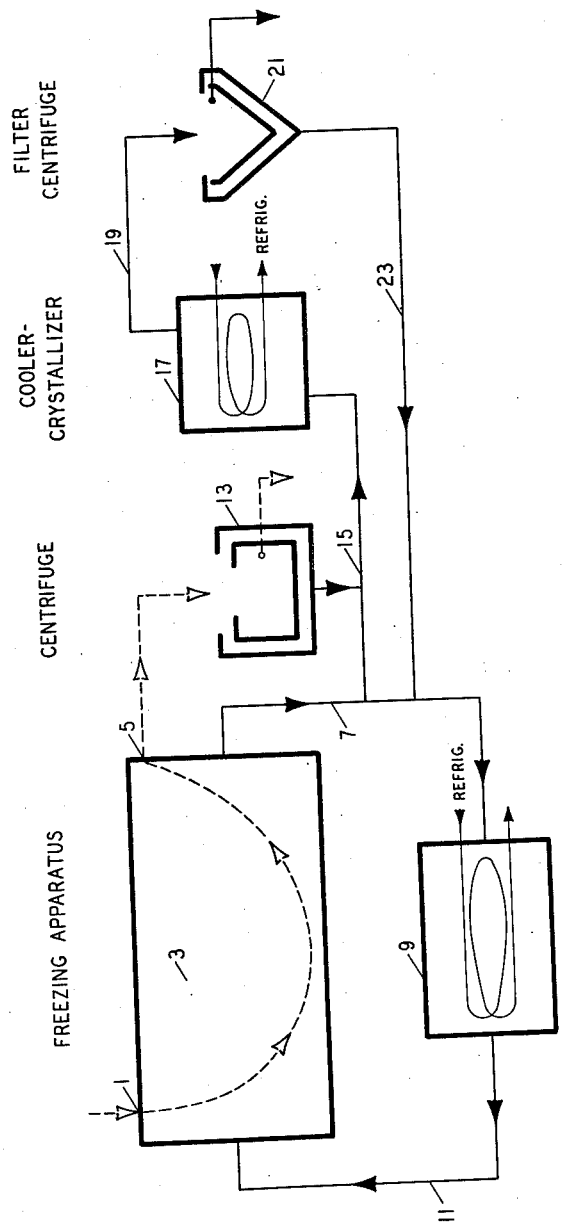
Robert B. Taylor
INVENTOR
BY Arthur L. Davis
ATTORNEY Patented Dec. 24, 1940

2,225,669

UNITED STATES PATENT OFFICE 2,225,669

PURIFICATION OF REFRIGERANT

Robert B. Taylor, near Knoxville, Tenn.

Application May 25, 1939, Serial No. 275,701

11 Claims. (Cl. 62—124)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the freezing of foods. It is particularly directed to the purification of liquid freezing media used in the quick freezing of foods by direct contact of the food with the liquid medium at a temperature substantially below the freezing point of the foods.

I have previously found that in the preservation of foods by freezing two essential conditions must be maintained in order to preserve to the greatest extent the natural characteristics of the food. The food should not be subjected during the freezing process to a temperature substantially lower than the safe storage temperature of the frozen food and the freezing operation should be effected so rapidly that only very small crystals are formed in the foodstuff.

A particularly effective and successful method for the quick freezing of foods which complies with both of these conditions is described in my application Serial No. 91,442, filed July 18, 1936. This method comprises directly contacting the food, preferably in the form of units having at least one dimension which does not exceed about one inch, with an aqueous refrigerant solution having a freezing point not higher than 0° F. and a low viscosity at 0° to 10° F. and which is suitable for use in direct contact with foods, maintaining the temperature of the solution between the temperature at which the food may be safely stored and a temperature substantially below the freezing point of the food, and circulating the solution over the food at such a rate that the temperature of the solution adjacent the food remains below the freezing point of the food. Particularly advantageous refrigerant solutions are provided by aqueous solutions of invert sugar which may, in general, be used for the freezing of fruit, vegetables and meats. Aqueous solutions of salts, particularly sodium chloride, may also be used, especially for the freezing of vegetables and meats.

In the operation of freezing methods of the type just described, it has been found that the refrigerant solutions tend to become contaminated with food debris which is very difficult to remove. Such debris, consisting principally of fragments of the food being frozen, does not readily settle out of the solution and neither filtration nor centrifugal separation have been found effective in removing these contaminations.

A principal reason for the difficulties which have been encountered in the removal of such food debris is, that upon continued contact of the freezing medium with the frozen food particles, an osmotic interchange takes place between the cell contents and the freezing medium. The result of this process is that upon approaching osmotic equilibrium the cell contents of the food particles no longer have a freezing point above that of the freezing medium and the particles thaw out and become soft. At the same time, the specific gravity of the food particles becomes approximately the same as that of the freezing medium so that the particles will not settle out of the solution. Moreover, due to this substantially equivalent density of the particles and solution there is no density difference to be affected by the separating forces of centrifugal separators.

I have now found, however, that when using aqueous solutions as a freezing medium, the purification of the solutions may be effected in a very simple and satisfactory manner. This is accomplished by lowering the temperature of the solution to a point where crystals are formed and then subjecting the solution to centrifugal separation. I have found that when the contaminated solution is chilled until crystallization begins, the crystals tend to form upon the contaminating solid particles as nuclei, thus forming particles having a sufficiently different density from the solution to permit their separation from the solution by centrifuging.

This method of purification is particularly satisfactory and effective when applied to aqueous refrigerant solutions of such composition that upon lowering the temperature of the solution ice crystals appear before crystals containing the solute, that is, solutions which are on the ice side of the eutectic composition, as I have found that upon partial freezing of such solutions the ice crystals do not form an adherent coating on the cooling surface but tend to remain suspended in the solution.

It is, of course, desirable to carry the cooling of such aqueous refrigerant solutions only to the point where a small amount of crystallization has occurred, the formation of thick mushes being avoided. This can readily be regulated by adjusting the temperature to which the solution is cooled, so that the solution is cooled to a temperature only slightly below the temperature at which crystallization begins.

This method is particularly adapted to maintain the purity of aqueous refrigerant solutions which initially have a predetermined freezing point. Either a portion of such solution may be removed directly from the zone of freezing or may be removed from frozen food withdrawn from such zone and the solution so removed may be cooled to said predetermined freezing point whereby the water in such solution in excess of that required for the predetermined freezing point of the solution separates as ice crystals associated with food debris. After separating such crystals and the accompanying food debris the solution so purified is returned to the zone of freezing. Under some conditions it may be desirable to cool the solution so removed to a temperature slightly below said predetermined freezing point in order to remove additional water so that the solution returned to the freezing zone may have a concentration such that when mixed with other aqueous refrigerant solution entering the freezing zone said mixture will have substantially said predetermined freezing point.

It is particularly advantageous to remove portions of the freezing solution from the main body thereof substantially continuously rather than to treat the whole body of the solution at separated intervals as by the continuous treatment of the solution many of the food particles in the solution will not have arrived at the osmotic equilibrium referred to above and their separation from the solution is thereby further facilitated.

A desirable method of operation comprises cooling to the point of partial crystallization, and immediately centrifuging, the solution removed from the frozen food as it comes from the freezing apparatus and thereafter returning the purified solution to the freezing operation.

If necessary, sufficient water may be added to the purified solution to compensate for the water removed as ice in the purification operation. Due to the fact that in the freezing operation the freezing solution tends to become diluted by the absorption of water from the food being treated, it will be seen that this purification method also affords a very advantageous means for maintaining the desired concentration of the freezing medium, as the addition of water to the purified solution can readily be adjusted to maintain the solution at any predetermined concentration.

For the purpose of illustration, the invention will be more particularly described with reference to the accompanying drawing which is a diagrammatic representation of a system of apparatus for freezing foods embodying the principles of the present invention.

In the drawing, the comestible to be frozen is admitted through inlet 1 of the freezing apparatus 3 and is withdrawn through outlet 5 after passing in direct contact with the aqueous refrigerant solution, which may, for example, be an aqueous solution of invert sugar containing 57% to 58% by weight of invert sugar and having a freezing point of 0° F. The refrigerant solution is maintained at a proper temperature for freezing a comestible, for example, between 4° F. and 10° F., by passing the same from the freezing apparatus 3 through conduit 7, through the refrigerating machine 9 and returning the same to freezing apparatus 3 through conduit 11. The frozen food withdrawn from the freezing apparatus 3 is passed into a centrifuge 13 wherein substantially all the refrigerant solution is removed from the frozen food. The refrigerant solution so removed from the frozen food, together with solid contaminants, is passed through conduit 15 and through a heat exchange device or cooler 17 wherein such solution is cooled by heat exchange with refrigerant to a temperature at which ice crystals form in the solution. When treating the particular solution described above, it has been found suitable to cool the solution to a temperature of 0° F., when it is desired to maintain substantially the original freezing point of the solution, or to a temperature below the aforestated freezing point temperature of the original solution, such as —5° F., when it is desired to concentrate the solution slightly above the original concentration before return to the body of the refrigerant solution in the freezing apparatus. That portion of the refrigerant solution so cooled and containing ice crystals and associated with solid contaminants in suspension is then passed through conduit 19 and into filter centrifuge 21 wherein the ice crystals and the accompanying solid contaminants carried by the solution are removed and the clarified and somewhat concentrated solution is then returned to the body of the refrigerant solution through conduit 23. Similarly, a portion of the body of the refrigerant solution may be removed from conduit 7 through conduit 15 and purified in the same manner as that refrigerant solution which has been removed from the frozen comestible.

It will be seen, therefore, that this invention actually may be carried out by the use of various modifications and changes without departing from its spirit and scope.

I claim:

1. A method of purifying aqueous refrigerant solutions contaminated with food debris from direct contact with foods which comprises chilling the solution until a relatively small amount of crystallization has occurred, and thereafter separating the crystals and accompanying debris from the solution.

2. A method of purifying aqueous refrigerant solutions contaminated with food debris from direct contact with foods which comprises chilling the solution to a temperature a few degrees below the temperature of incipient crystallization, and thereafter separating the crystals and accompanying debris from the solution.

3. A method of purifying aqueous refrigerant solutions contaminated with food debris from direct contact with foods which comprises chilling the solution until a relatively small amount of crystallization has occurred, and thereafter separating the crystals and accompanying debris from the solution by subjecting the partially crystallized solution to centrifugal separation.

4. A method of purifying aqueous refrigerant solutions contaminated with food debris from direct contact with foods which comprises chilling the solution to a temperature a few degrees below the temperature of incipient crystallization, and thereafter separating the crystals and accompanying debris from the solution by subjecting the partially crystallized solution to centrifugal separation.

5. A method of purifying aqueous refrigerant solutions containing more water than corresponds to the eutectic composition and contaminated with food debris from direct contact with foods which comprises chilling the solution until a relatively small amount of ice crystals have formed, and thereafter separating the ice crystals and accompanying debris from the solution by subjecting the partially crystallized solution to centrifugal separation.

6. A method of purifying aqueous refrigerant solutions containing more water than corresponds to the eutectic composition and contaminated with food debris from direct contact with foods which comprises chilling the solution to a temperature a few degrees below the temperature of incipient crystallization, and thereafter separating the ice crystals and accompanying debris from the solution by subjecting the partially crystallized solution to centrifugal separation.

7. In the freezing of foods by direct contact thereof with an aqueous refrigerant solution, the improvement which comprises chilling the solution which has been removed from the food after the freezing operation to a temperature below the temperature of incipient crystallization, thereafter separating the crystals and accompanying food debris from the solution by subjecting the partially crystallized solution to centrifugal separation, and returning the solution to the freezing operation.

8. In the freezing of foods by direct contact thereof with an aqueous refrigerant solution, the improvement which comprises continuously removing a portion of the solution from the zone of freezing, chilling the solution so removed to a temperature below the temperature of incipient crystallization, thereafter separating the crystals and accompanying food debris from the solution by subjecting the partially crystallized solution to centrifugal separation, and returning the solution to the zone of freezing.

9. In the freezing of foods by direct contact thereof with an aqueous refrigerant solution, the improvement which comprises subjecting the frozen food after the freezing operation to centrifugal force to remove adherent solution from the frozen food, chilling the separated solution to a temperature below the temperature of incipient crystallization, thereafter separating the crystals and accompanying food debris from the solution by subjecting the partially crystallized solution to centrifugal separation, and returning the solution to the freezing operation.

10. In the freezing of foods by direct contact thereof with an aqueous refrigerant solution having a predetermined freezing point, the improvement which comprises removing a portion of the solution from the zone of freezing, cooling the solution so removed to the temperature corresponding to said predetermined freezing point whereby the water in such solution in excess of that required for the predetermined freezing point of the solution separates from the cooled solution as ice crystals associated with accompanying food debris, thereafter separating the crystals and the accompanying food debris from the solution, and returning the solution to the zone of freezing.

11. In the freezing of foods by direct contact thereof with an aqueous refrigerant solution having a predetermined freezing point, the improvement which comprises continuously removing a portion of the solution from the zone of freezing, cooling the solution so removed to the temperature corresponding to said predetermined freezing point whereby the water in such solution in excess of that required for the predetermined freezing point of the solution separates from the cooled solution as ice crystals associated with accompanying food debris, thereafter separating the crystals and the accompanying food debris from the solution, and returning the solution to the zone of freezing.

ROBERT B. TAYLOR.